United States Patent
Lutz et al.

(10) Patent No.: US 7,197,810 B2
(45) Date of Patent: Apr. 3, 2007

(54) TRANSPORT SYSTEM

(75) Inventors: Werner A. Lutz, Krichheim (DE); Klaus Wohlfarth, Satteldorf (DE)

(73) Assignee: Cooper Power Tools GmbH + Co., Westhausen (DE)

( * ) Notice: Subject to any disclaimer, the term of this patent is extended or adjusted under 35 U.S.C. 154(b) by 162 days.

(21) Appl. No.: 10/504,011

(22) PCT Filed: Dec. 23, 2002

(86) PCT No.: PCT/EP02/14737

§ 371 (c)(1), (2), (4) Date: Feb. 9, 2005

(87) PCT Pub. No.: WO03/066279

PCT Pub. Date: Aug. 14, 2003

(65) Prior Publication Data

US 2005/0188527 A1    Sep. 1, 2005

(30) Foreign Application Priority Data

Feb. 8, 2002  (DE) ........................... 202 01 964 U

(51) Int. Cl.
*B23P 23/00* (2006.01)

(52) U.S. Cl. ................. 29/564.1; 29/791; 29/795; 29/824; 29/823; 29/33 K; 29/33 P; 198/570; 198/341.01

(58) Field of Classification Search .................. 29/791, 29/795, 822, 823, 824, 711, 33 K, 33 P, 564.1; 198/570, 341.01, 341.03, 341.02; 104/172.4
See application file for complete search history.

(56) References Cited

U.S. PATENT DOCUMENTS

| 4,674,181 | A | * | 6/1987 | Hamada et al. ................ 29/703 |
| 4,964,497 | A | * | 10/1990 | Bundo et al. .......... 198/341.02 |
| 5,195,629 | A | * | 3/1993 | Gottstein et al. ........ 198/465.2 |
| 5,319,845 | A |   | 6/1994 | Watanabe et al. |

(Continued)

FOREIGN PATENT DOCUMENTS

DE    4225338    2/1994

(Continued)

*Primary Examiner*—Essama Omgba
(74) *Attorney, Agent, or Firm*—Coats & Bennett, PLLC

(57) ABSTRACT

In a transport system for flow line production, especially in the car manufacturing industry, workpieces are movable along at least two first guides between working stations in transportation direction. At least one working station is configured as a screwing and/or assembling means which particularly comprises a plurality of working tools. To improve such a transport system in a way that with little constructional efforts and at reduced costs the assignment of working station and workpiece to be worked thereby is simplified and made possible in an accurate and reproducible manner, the screwing and/or assembling means is integrated into the transport system and is movable at least over a working path in parallel with the first guides in the transport system.

25 Claims, 4 Drawing Sheets

U.S. PATENT DOCUMENTS

| | | | |
|---|---|---|---|
| 5,353,490 A * | 10/1994 | Kukuljan | 29/564 |
| 5,539,975 A | 7/1996 | Kukuljan et al. | |
| 5,848,458 A | 12/1998 | Bullen | |
| 5,862,904 A | 1/1999 | Tominaga | |
| 5,920,974 A * | 7/1999 | Bullen | 29/33 K |
| 6,098,269 A * | 8/2000 | Albus et al. | 29/564 |
| 6,193,049 B1 * | 2/2001 | Noda | 198/346.2 |
| 6,245,284 B1 * | 6/2001 | Cooper, Sr. | 266/61 |
| 6,419,071 B1 * | 7/2002 | Oldford et al. | 198/345.3 |
| 6,719,122 B2 * | 4/2004 | Oldford et al. | 198/345.3 |
| 6,827,197 B2 * | 12/2004 | Oldford et al. | 198/346.3 |
| 6,886,241 B2 * | 5/2005 | Tachibana et al. | 29/791 |
| 2002/0189085 A1 * | 12/2002 | Menzio | 29/791 |
| 2003/0116407 A1 * | 6/2003 | Takano et al. | 198/722 |
| 2005/0257361 A1 * | 11/2005 | Ramnauth et al. | 29/430 |

FOREIGN PATENT DOCUMENTS

| | | | |
|---|---|---|---|
| JP | 58066637 A | * | 4/1983 |

* cited by examiner

TRANSPORT SYSTEM

BACKGROUND

The present invention relates to a transport system for flow line production, especially in the car manufacturing industry, comprising workpieces which are movable along at least two first guides between working stations in transportation direction, at least one working station being configured as a screwing and/or assembling means which particularly comprises a plurality of working tools.

Examples of such workpieces are vehicle components such as engine block, transmission or other vehicle parts that must be worked on before actual installation into the vehicle. Said workpieces are moved along at least two first guides of the transport system between associated working stations. The two first guides can be arranged both horizontally side by side and vertically one below the other. The working stations are separately arranged next to the transport system. Corresponding supply means, separate transportation systems, corresponding installations in the building, or the like are needed for the working stations.

Due to the separate arrangement and configuration of the working stations and the transport systems for the workpieces, the constructional efforts are relatively great on the one hand, which leads to an increased demand for space and also to increased costs. On the other hand, the assignment of working stations and workpiece is made difficult by the separated configuration of working stations and transport system because the transport system for the workpiece and the working stations must be aligned exactly relative to one another to assign working station and workpiece to be worked in a reproducible way relative to one another. This very alignment leads to increased installation efforts, which is also accompanied by additional costs.

It is therefore the object of the present invention to improve a transport system of the above-mentioned type such that with little constructional efforts and at reduced costs the assignment of working station and workpiece to be worked thereby is simplified and made possible in an exact and reproducible manner.

This object is achieved in a transport system where the screwing and/or assembling means is integrated into the transport system and is movable at least over a working path in parallel with the first guides in the transport system.

Thanks to the integration of the working station in the transport system, here above all screwing and/or assembling means, additional and separate guides that are separated from the transport system are not needed. Additional installations, for instance for the supply of power to the working station, are also not needed because the supplies inherent to the transport system can be resorted to in a corresponding way. No longer needed is also a corresponding difficult alignment of the working station relative to the transport system and thus to the workpiece because an alignment is directly carried out on the transport system and not by separate guides, or the like, owing to the integration of the working station in the transport system. The working station is thus movable in a much simplified way with a permanently correct alignment relative to the workpiece.

To prevent a situation where the working station represents a load on the two first guides for the workpiece, the screwing and/or assembling means can be moved along second guides in parallel to the first guides. It is here self-evident that the second guides are integrated into the transport system and are not arranged to be separated therefrom.

The assignment of the first and second guides can be simplified and improved in that the first and second guides are arranged on the same guide stands of the transport system. Depending on the arrangement of the first guides (horizontal, vertical), the second guides are arranged accordingly. When the same guide stands are used, this results, in addition, in a normally reduced number of guide stands because guide stands are not arranged separately for first and second guides in the transport system.

A simple arrangement of the guides with simultaneously simplified orientation of the guides relative to one another can be seen in that the first and second guides are arranged in pairs at opposite sides of the guide stands. The arrangement can be configured again accordingly vertically or horizontally for respectively first and second guides.

To move the working station along the transport system and especially independently of the workpiece in a simple way, first and second guides may each have assigned thereto a drive means for workpiece and screwing and/or assembling means, respectively. The drive means for the screwing and/or assembling means is especially used when after the treatment of the workpiece the working station is returned into its initial position. It is also possible that working station and workpiece are also moved during treatment of the workpiece through a corresponding synchronization of the two drive means.

Electric motors are for instance possible as drive means, the electric motors moving working station and workpiece, respectively, along the corresponding guides by means of corresponding gears, or the like. Such an electric motor may be assigned to each working station and each workpiece, respectively. However, to move a multitude of workpieces by a drive means and also a multitude of working stations by only one drive means, the corresponding drive means may be designed as a rotatable shaft which is acted upon by at least one friction wheel having an adjustable angle of inclination. A friction drive is thereby formed which upon contact of friction wheel and shaft moves workpieces and working stations, respectively, in transportation direction. The speed in the transportation direction can here be varied by changing the angle of inclination of the friction wheel. When such friction wheels are used, it is also possible in a simple way to interrupt the kinetic connection to the drive means by removing the friction wheels from the shaft.

To hold a corresponding workpiece in a simple way and to move it independently of the form and configuration thereof along the transport system, the workpiece may be detachably secured to a workpiece carrier, the friction wheels being arranged on the workpiece carrier. It is also possible to transport different workpieces with the same workpiece carrier.

To standardize, by analogy, the working station with respect to its support on the guides, the screwing and/or assembling means as the working station may comprise a working tool carrier which is movably supported on the second guides and on which the working tools are displaceably supported towards the workpiece. This creates, inter alia, the possibility that with an otherwise identical working tool carrier different working tools are used, depending on the respective requirements, and are moved with the working tool carrier along the second guides.

For reasons of space the working tool carrier and/or workpiece carrier may be substantially plate-shaped and comprise slide rails which project in the direction of the first guides and second guides, respectively, and are displaceable along said guides. For instance, if the first and second guides are each arranged vertically one above the other, a slide rail of each guide moves along an upper side of the lower guide and a further slide rail along an upper side of the upper guide.

To reduce friction between guide and slide rails to a substantial degree, guide rolls may be rotatably supported on the slide rails.

To be able to move all working tools, if possible, in synchronism and with a permanent alignment relative to one another, the working tool carrier may be provided especially at one end with a displacement means for displacing the working tools between ready position and work position. In the work position the working tools are aligned relative to the workpiece such that the latter can be worked. In the ready position the working tools can be displaced to such a degree that they present, for instance, no obstacle for the workpieces to be worked, for workers carrying out other operations, or the like.

It is also possible that the working tools are in principle arranged fixedly in their work position, a corresponding displaceable support by displacement means, or the like, being here omitted.

To obtain a simple displacement means, said means may comprise at least two transverse carriers extending above the first and second guides, along which the working tools are displaceable in a direction transverse to the transportation direction. The working tools can thereby be assigned substantially from above to the workpiece and finally moved to the workpiece for treatment.

The working tools as such can be configured in very different ways, depending on the kind of treatment for the workpiece. Examples of such working tools are drills, thread cutters, polishing means, screwdrivers, assembling devices, or the like. To be able to carry out many screwing or drilling operations in a simple way, the working tools are designed as screwdrivers with telescopically displaceable wrench heads that are displaceably supported between retracted position and operative position, as are e.g. described in DE 201 14 662.2 of the same applicant.

It should here be noted that the working tools are initially arranged in their retracted position e.g. during displacement of the working tools into the operative position and that they are only displaced by corresponding operation of the working tools into their operative position.

The displacement between retracted position and operative position can take place automatically, and after a correct assignment with respect to the workpiece the displacement into the operative position, for instance, and the subsequent treatment of the workpiece take place. The return movement into the retracted position can also take place automatically in a corresponding way after the working of the workpiece has been completed.

In a simple embodiment the working tools can be displaced manually between retracted position and operative position.

It has already been pointed out that the first and second guides may each be arranged horizontally or vertically. With a vertical arrangement, the demand for space is normally reduced.

To move the working tools in a simple way back into the retracted position after a manual displacement of the working tools into the operative position, the working tools may be acted upon by a force towards the retracted position. Actuation by a force may e.g. be carried out by a corresponding spring means or the like.

Especially with a manual assignment of the working tools relative to the workpiece in order to permit an exact alignment between the two, the working tools in their operative position may be aligned relative to the workpiece and optionally detachably fixed in said aligned position. The alignment can take place via a corresponding indexing means, and with an arrangement of the working tools in this correctly aligned position, a fixation by locking or the like can advantageously be carried out between working tools and workpiece or between working tools and workpiece carrier.

Since the assignment of working tools and workpiece takes place in flow line production, it is self-evident that the corresponding assignment and alignment of working tool and workpiece is also maintained during movement in transportation direction. This is simply carried out in that the movements of screwing and/or assembling means are synchronized. The term "synchronization" must here be interpreted such that very different types of kinetic coupling between working station and workpiece are comprised. One type of synchronization can e.g. be performed by a detachable fixation in the aligned position; see the above observations. It is also possible that working tool carrier and workpiece carrier are detachably coupled with one another as long as there is no working of the workpiece. This means, for instance, that the workpiece carrier or the working tool carrier drag along the respectively other member. Another possibility of synchronization is an electrical/electronic synchronization which is e.g. performed via the drive means, a master-slave relationship possibly existing between workpiece carrier and working station. Of course, a corresponding synchronization can also be performed mechanically in that e.g. a kinetic connection is established between screwing and/or assembling means and workpiece or workpiece carrier, respectively.

In flow line production the workpiece moves from one working station to the other one whereas the working stations are only assigned to a specific working area. To be able to work different workpieces one after the other in this area, it must be regarded as an advantage when the screwing and/or assembling means can be returned in a direction opposite to the transportation direction up to and into their initial position automatically after decoupling of workpiece and/or workpiece carrier. In this initial position a new workpiece is then supplied and worked. It is self-evident that a return movement into the initial position can also be carried out manually.

To use working stations, for instance, not only for the return movement into the initial position in the case of a drive means for essentially all working stations, screwing and/or assembling means and drive means assigned thereto may be drivingly connected especially during the return movement. During movement together with the workpiece for the treatment thereof, a corresponding decoupling from the drive means takes place and e.g. a corresponding kinetic connection is established with respect to the workpiece and workpiece carrier, respectively, or optionally also with respect to the drive means of workpiece/workpiece carrier. The kinetic connection can of course also be realized during movement in transportation direction.

To be able to operate all working tools in synchronism and manually, all working tools can be displaced at the same time and especially manually by means of a guide plate into the operative position.

To ensure the supply of the working station during its movement along the working area of the workpiece in a simple way, the screwing and/or assembling means may have assigned thereto a cable towing means.

It is self-evident that the corresponding working tools can be fed to the workpiece in different ways. One feeding possibility is in vertical direction from the top to the bottom. The working tools are arranged accordingly above or below the workpiece in their retracted position and operative position.

However, it is also possible that the working tools are supplied in horizontal direction to the workpiece. In this instance the working tools project substantially vertically from the working tool carrier and pass at least between and through the first guides. This is applicable in case of a vertical arrangement of the guides. With a horizontal arrangement of the guides a horizontal supply of the working tools can of course take place without any projection through the first guides.

BRIEF DESCRIPTION OF THE DRAWINGS

Advantageous embodiments of the invention will now be explained in more detail with reference to the figures which are attached to the drawing, and of which.

DETAILED DESCRIPTION

Figure 1:
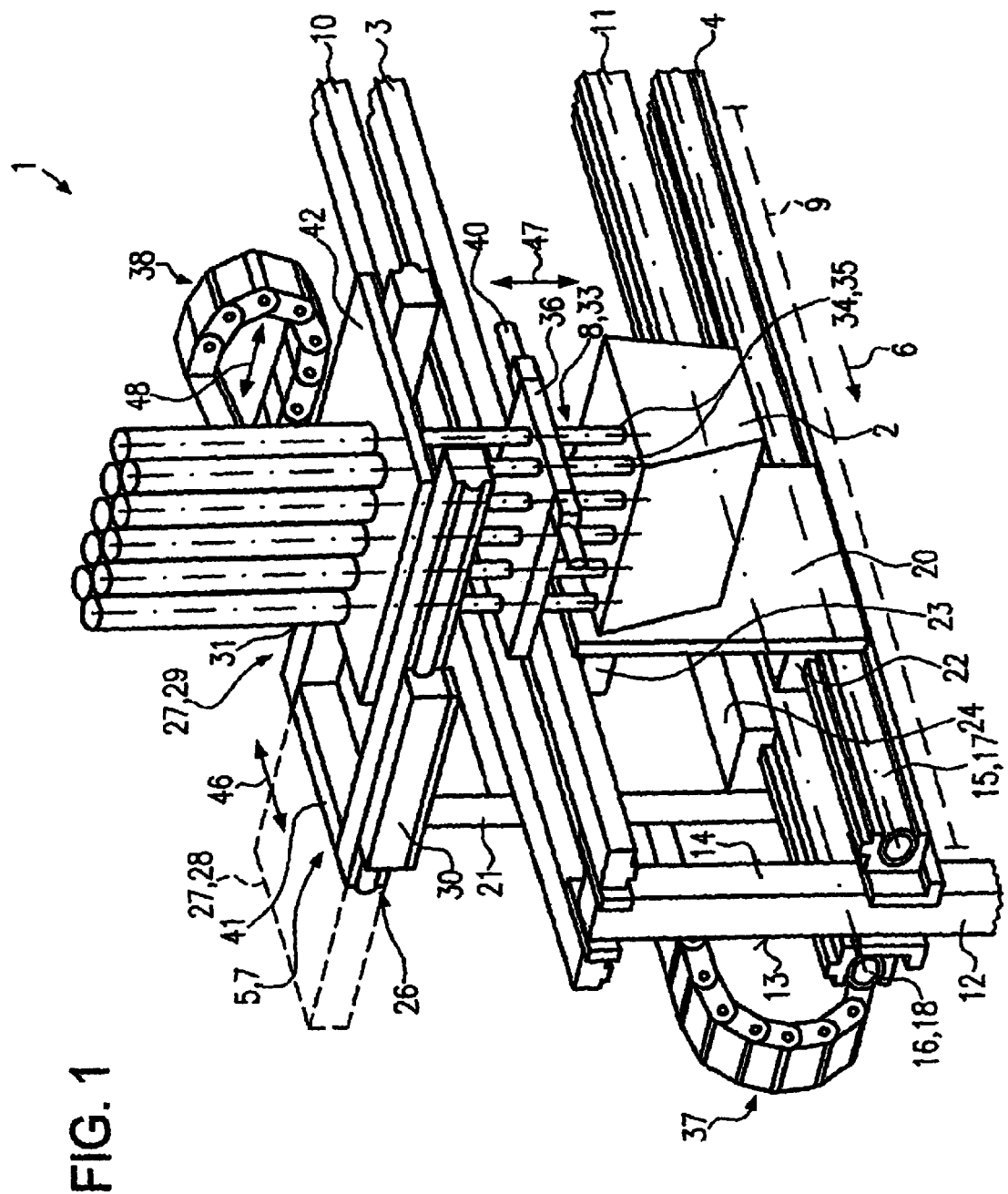
FIG. 1 is a perspective front view of a first embodiment of the transport system according to the invention.

FIG. 1 is a perspective front view of a first embodiment of the transport system 1 according to the invention. The transport system 1 comprises two pairs of guides 3, 4, 10, 11. The pair of first guides 3, 4 serves to guide a substantially plate-shaped workpiece carrier 20 which has a workpiece 2 detachably secured thereto. The workpiece carrier 20 comprises two slide rails 22, 23 at its back side facing away from the workpiece 2. The slide rail 22 is movable along an upper side of the lower first guide 4, the slide rail 23 being movable along a bottom side of the upper first guide 3.

The workpiece carrier 20 is kinetically connected to a drive means 15, which is designed as a shaft 17. The shaft 17 rotates substantially continuously in one direction, the kinetic connection between workpiece carrier 20 and shaft 17 being established via a number of friction wheels 19, see FIG. 2. The wheels are supported on the workpiece carrier 20 to be rotatable and adjustable in their angle of inclination relative to the transportation direction 6 and the longitudinal direction of the shaft 17, respectively.

The first guides 3, 4 are mounted on a plurality of spaced-apart guide stands 12, of which only one is shown in FIG. 1. The first guides 3, 4 are here mounted at a side 14 of the guide stand 12. A further pair of second guides 10, 11 is mounted at the opposite side 13. Each of the second guides 10, 11 is arranged in parallel with the first guides 3, 4. The second guides 10, 11 serve to guide and move a working station 5. In the illustrated embodiment, said station is designed as a screwing and/or assembling means 7. The working station 5 comprises a substantially plate-shaped working tool carrier 21 whose inner side facing the workpiece carrier 20 has arranged thereon two slide rails 24, 25. By analogy with slide rails 22, 23, these are in contact with the second guides 10, 11; see also FIG. 2.

The lower slide rail 23 comprises corresponding friction wheels 19 which are supported thereon to be rotatable and adjustable in their angle of inclination. The friction wheels 19 can be brought into contact with a further shaft 18 as drive means 16 for the working station 5. The shaft 18 extends in a corresponding manner in parallel with shaft 17, its direction of rotation, however, being inverse to the direction of rotation of shaft 17 in the illustrated embodiment; see the following description.

At its upper end 26 the working tool carrier 21 comprises two transverse carriers 30, 31 that are arranged to be perpendicular to said carrier 21. Said transverse carriers form part of a displacement means 27. On their insides oriented to each other, the transverse carriers 30, 31 comprise guide surfaces for a substantially U-shaped bracket 41. Said bracket is displaceable by means of guide rolls 43 (see also FIGS. 2 and 3) along the transverse carriers 30, 31.

FIG. 1 shows a ready position 28 in broken line and a work position 29 of the displacement means 27 in unbroken line. At their front ends, the U-legs of the U-bracket 41 have arranged thereon a support plate 42. Said plate serves to hold a plurality of working tools 8 with corresponding drive means for said working tools. The working tools 8 are here designed as screwdrivers 34 with wrench heads 35. In FIG. 1, the screwdrivers 34 and wrench heads 35, respectively, are arranged in an operative position 33 in which the workpiece 2 is subjected to a corresponding treatment.

Figure 2:
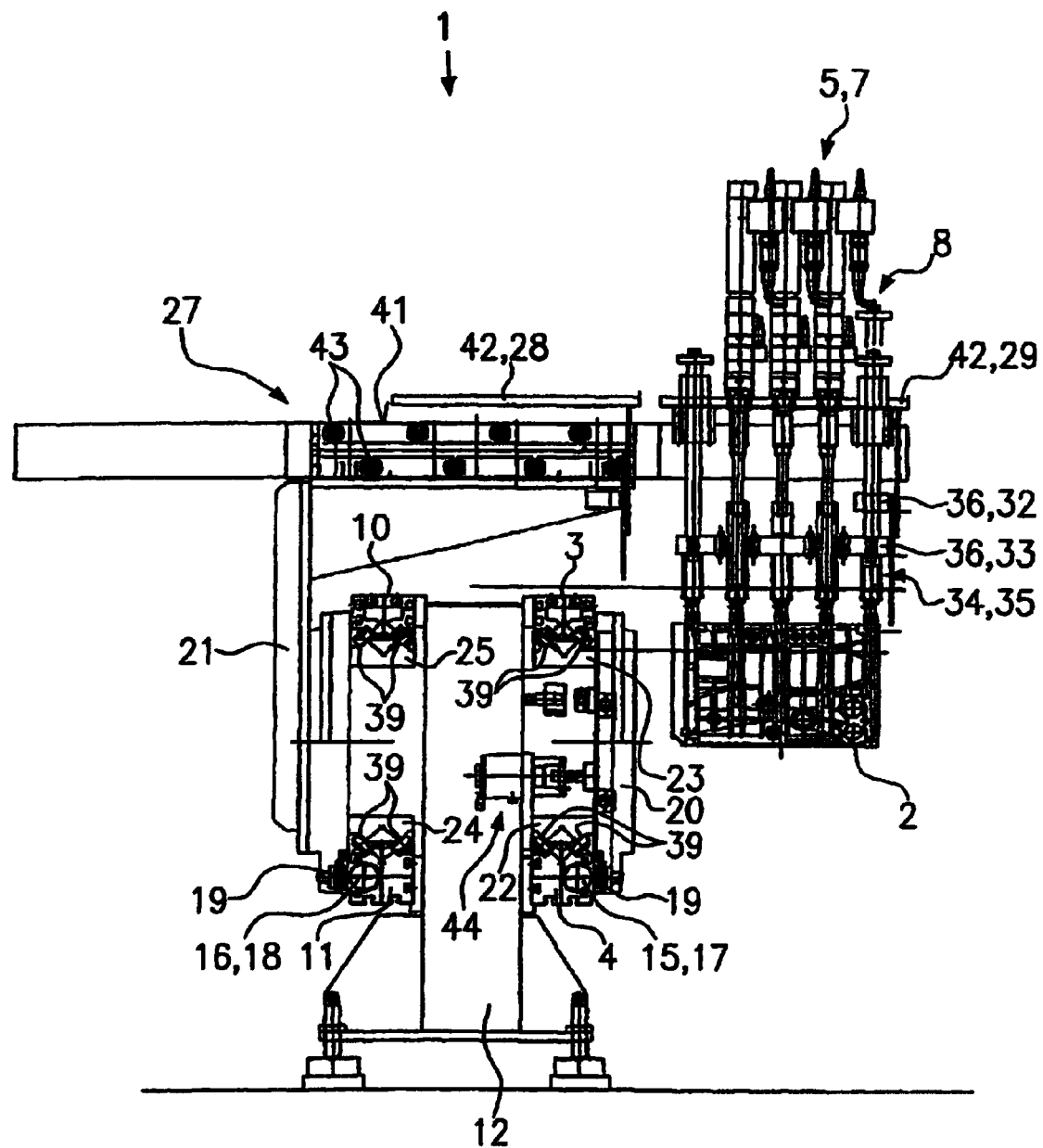
FIG. 2 is a partly cut side view of the transport system according to FIG. 1.

All of the screwdrivers 34 and wrench heads 35, respectively, are jointly displaceable in vertical direction by means of a manually operable guide plate 36 between their operative position 33 and their retracted position 32; see also FIG. 2. On the guide plate 36, grips 40 are arranged at both ends towards transportation direction 6 so as to be gripped by a worker. The working tools 8 are displaced in vertical direction 47. The support plate 42 is displaced in horizontal direction 48 perpendicular to transportation direction 6. The working station 5 is displaced in horizontal direction 46 in parallel with transportation direction 6, the working station being movable in the area of a working path 9.

It should here be noted that the configuration of the working station 5 as a screwing and/or assembling means 7 according to FIG. 1 is only by way of example and that other working tools 8 are also possible for the working station 5.

For the supply of the working station, cable towing means 37, 38 are arranged that are configured like a chain and allow for adequate clearance with respect to the two horizontal movements 46 and 48 of the working station.

FIG. 2 is a partly cut side view of the transport system 1 according to FIG. 1. Like reference numerals mark like parts in this figure just as in the remaining figures and are only mentioned in part in connection with a figure.

FIG. 2 shows, in particular, how workpiece carrier 20 and working tool carrier 21 are displaceable by means of their slide rails 22, 23 and 24, 25 along the first guides 3, 4 and the second guides 10, 11. The guides 3, 4 and 10, 11 are made from one section and guide rolls 39 which are rotatably arranged on the slide rails 22, 23 and 24, 25 roll on the outsides thereof. The guide rolls are each arranged in pairs and are inclined relative to one another at an angle of about 90°. Consequently, they roll on guide surfaces of the corresponding guides that are also inclined relative to one another at an angle of 90°.

Corresponding friction wheels 19 (see also FIG. 3) can be made out on the insides of workpiece carrier 20 and working tool carrier 21, respectively, which are oriented towards the shafts 17, 18. These wheels are supported on the carriers 20, 21 to be rotatable and adjustable around their axis of rotation with respect to the adjustment angle. Depending on the inclination of the friction wheels 19 relative to the shaft 17 and 18, respectively, the speed of workpiece carrier 20 and thus of working tool carrier 21 is variable.

As can particularly be seen in FIG. 2 in addition, the workpiece carrier 20 has assigned thereto a monitoring/controlling means 44 by which the position of the workpiece carrier along the transport system 1 can be detected and optionally corrected.

In FIG. 2, the working station 5 is shown in its work position 29 with guide plate 36 in the operative position 33. In these positions the workpiece 2 is worked by the corresponding working tools 8 of the working station 5. The ready position 28 with respect to support plate 42 and the retracted position 32 with respect to guide plate 36 are also hinted at in FIG. 2. In the ready position 28, the working station 5 is displaced in the displacement means 27 to such a degree to the left side in FIG. 2 that the corresponding working tools 8 are essentially arranged above the first and second guides 3, 4 and 10, 11. At the same time, the working tools are displaced by a corresponding vertical displacement of the guide plate 36 into the retracted position 32, so that ends of the working tools 8 that are assigned to the workpiece 2 are positioned above the guides.

Figure 3:
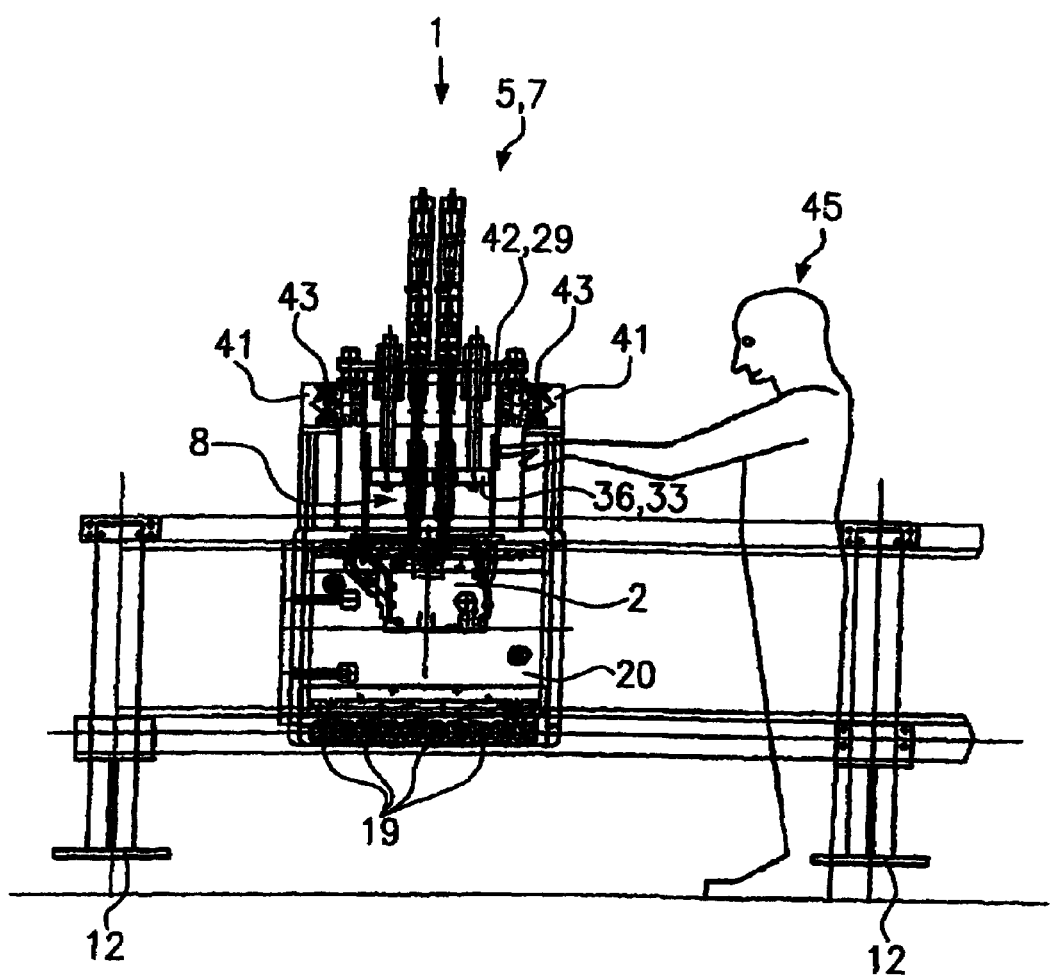
FIG. 3 is a front view of the transport system according to FIG. 1.

FIG. 3 is a front view of the transport system 1 according to FIG. 1. The friction wheels 19 which are arranged along shaft 17, see FIG. 1, can particularly be seen on the workpiece carrier 20. The working tools 8 of the working station 5, which is designed as a screwing and/or assembling means 7, are arranged in their operative position 33 due to manual operation performed by a worker 45. The working station 5 is movable by the worker 45 along the working path 9, see FIG. 1, in transportation direction 6, a detachable fixation being normally established between working station 5 and workpiece 2 and workpiece carrier 20, respectively. In this connection it is also possible to move working station 5 and workpiece 2 automatically and in synchronism with one another in transportation direction 6. Said synchronous movement can e.g. be performed by electronic synchronization of the drive means or a master-slave relation of the drive means.

As can further be seen in FIG. 3, the U-webs of the displacement means 7 and 20, see FIG. 1, are displaceably supported along guide rolls 43 on transverse carriers 30, 31.

Figure 4:
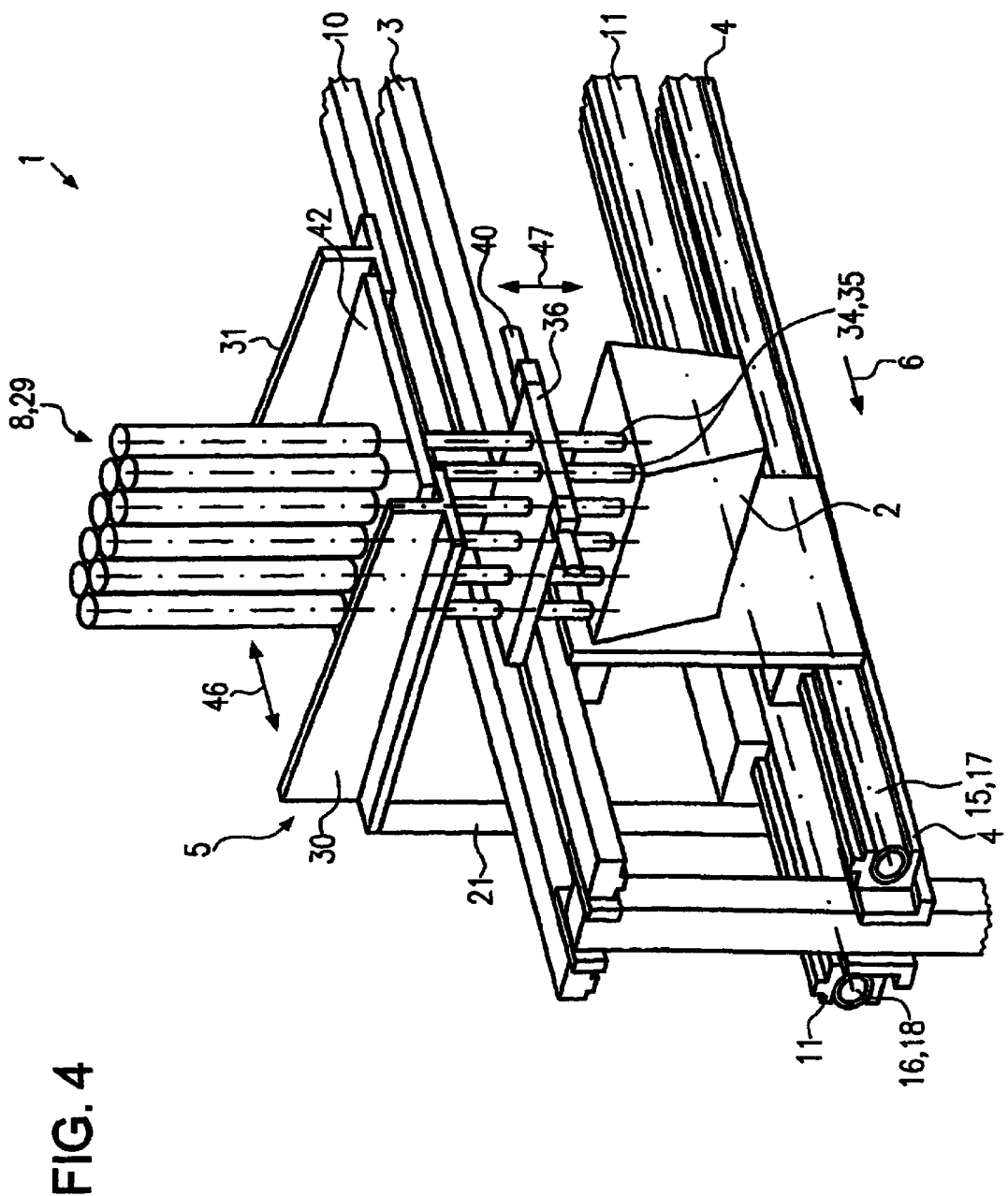
FIG. 4 is a perspective front view according to FIG. 1 of a second embodiment of the transport system of the invention.

FIG. 4 is a perspective front view according to FIG. 1 on a second embodiment of the transport system 1 according to the invention.

This embodiment specifically differs from the first embodiment of FIG. 1 in that the working station 5 is designed without a displacement means 27, so that the working tools 8 are permanently arranged in the work position 29. The support plate 42 is fixed relative to the transverse carriers 30, 31 in a corresponding way. Consequently, since the working station 8 is not movable in horizontal direction perpendicular to the transportation direction 6, a cable tow member 38, see FIG. 1, of the cable towing means can here be omitted.

The other details are identical with those of the embodiment according to the preceding figures.

Operation and function of the transport system according to the invention shall now be explained in a few words with reference to the figures.

According to FIG. 3 a worker first moves the working tools 8 by means of the guide plate 36 in horizontal direction perpendicular to the transportation direction 6, the drive means 16 being separated from the working station 5. In this process the working station 5 is entrained by the workpiece carrier 20 in transportation direction 6. The worker moves the individual working tools 8 by means of the guide plate 36 into the operative position 33, and the workpiece 2 is subsequently worked. During treatment the working tools are fixed with respect to the workpiece in that they are for instance locked in their operative position 33. After the workpiece 2 has been worked, the worker returns the working tools into the retracted position 32 and then the displacement means into the ready position 28; see embodiment according to FIGS. 1 to 3. The drive means is then again coupled with the working station, and a return movement is carried out in a direction opposite to the transportation direction into an initial position at an end of the working path 9 at which the treatment of a further workpiece will then start.

The invention claimed is:

1. A transport system for moving at least one workpiece in a transportation direction along a production line, comprising:
    a first work station, said first work station comprising tool means for applying
    a rotational force at a plurality of locations simultaneously;
    a second work station spaced from said first work station along the production line;
    first and second sets of guides disposed parallel to the transportation direction and connecting said first and second work stations;
    a plurality of guide stands disposed in spaced relation along the production line, said first and second sets of guides supported by said guide stands;
    a workpiece carrier moveable along said first set of guides for carrying the workpiece through at least said first work station and to said second work station;
    said tool means coupled to said second set of guides for movement along said production line in a direction parallel to said first set of guides;
    a first drive means for moving said workpiece carrier along said first set of guides and a second drive means for moving said tool means along said second set of guides;
    wherein said drive means each comprises a rotatable shaft and at least one friction wheel engaging said shaft, said friction wheels having an adjustable angle of inclination relative to the corresponding shaft.

2. The transport system of claim 1 wherein said first and second sets of guides are secured to common ones of said guide stands.

3. The transport system of claim 2 wherein said first and second sets of guides are arranged in pairs on opposite sides of said guide stands.

4. The transport system of claim 1 wherein the workpiece carrier includes at least one of said friction wheels, and wherein said workpiece is detachably secured to said workpiece carrier.

5. The transport system of claim 1 wherein said tool means comprises a tool carrier and a plurality of working tools displaceably supported by said tool carrier for movement toward and away from the workpiece on said workpiece carrier.

6. The transport system of claim 5 wherein at least one of said tool carrier and said workpiece carrier are plate-shaped and comprise slide rails which project toward the corresponding guide set and are moveable along the corresponding guide set.

7. The transport system of claim 6 wherein said at least one of said tool carrier and said workpiece carrier further comprise guide rolls rotatably supported on said slide rails.

8. The transport system of claim 5 wherein said tool carrier comprises a displacement means for displacing the working tools between a ready position and a work position.

9. The transport system of claim 8 wherein said displacement means comprises at least two transverse carriers that extend above the first and second guide sets, said working tools displaceable along said transverse carriers in a direction transverse to the transportation direction.

10. The transport system of claim 5 wherein said working tools comprise screwdrivers which are displaceably supported between a retracted position and an operative position, said screwdrivers including telescopically movable wrench heads.

11. The transport system of claim 10 wherein said working tools are manually adjustable between a retracted position and an operative position.

12. The transport system of claim 10 wherein said working tools are acted upon by a force towards the retracted position.

13. The transport system of claim 10 wherein said working tools are, in the operative position, aligned relative to the workpiece.

14. The transport system of claim 13 where said working tools are detachably fixed in their aligned position.

15. The transport system of claim 10 wherein said plurality of working tools are displaceable at the same time into the operative position.

16. The transport system of claim 15 wherein said plurality of working tools are displaceable at the same time into the operative position via manual movement of a guide plate.

17. The transport system of claim 1 wherein said guides of said first guide set are vertically arranged with respect to each other and wherein said guides of said second guide set are vertically arranged with respect to each other.

18. The transport system of claim 1 wherein movements of said tool means and said workpiece carrier are synchronized.

19. The transport system of claim 1 wherein said tool means is moveably coupled to at least one of the workpiece and the workpiece carrier.

20. The transport system of claim 19 wherein said tool means automatically returns to an initial position by movement in a direction opposite to the transportation direction upon decoupling from said one of the workpiece and the workpiece carrier.

21. The transport system of claim 20 wherein said tool means comprises a tool carrier and a plurality of working tools displaceably supported by said tool carrier for movement toward and away from the workpiece on said workpiece carrier; wherein said first drive means and said tool carrier are drivingly connected during the automatic return movement to said initial position.

22. The transport system of claim 1 further comprising a cable towing means associated with said tool means.

23. The transport system of claim 1 wherein said tool means comprises a tool carrier and a plurality of working tools displaceably supported by said tool carrier for movement toward and away from the workpiece on said workpiece carrier; wherein said plurality of tools project substantially vertically from said tool carrier and are displaceable to a point at a level between the guides of said first set of guides.

24. The transport system of claim 1:
wherein said first and second sets of guides are secured to common ones of said guide stands;
wherein said first and second sets of guides are arranged in pairs on opposite sides of said guide stands;
further comprising a first drive means for moving said workpiece carrier along said first set of guides and a second drive means for moving said tool means along said second set of guides, wherein said drive means each comprise a rotatable shaft and at least one friction wheel engaging said shaft, said friction wheels having an adjustable angle of inclination relative to the corresponding shaft;
wherein the workpiece carrier includes at least one of said friction wheels, and wherein said workpiece is detachably secured to said workpiece carrier;
wherein said tool means comprises a tool carrier and a plurality of working tools displaceably supported by said tool carrier for movement toward and away from the workpiece on said workpiece carrier;
wherein at least one of said tool carrier and said workpiece carrier are plate-shaped and comprise slide rails which project toward the corresponding guide set and are moveable along the corresponding guide set;
wherein said at least one of said tool carrier and said workpiece carrier further comprise guide rolls rotatably supported on said slide rails;
wherein said working tools comprise screwdrivers which are displaceably supported between a retracted position and an operative position, said screwdrivers including telescopically movable wrench heads;
wherein said working tools are acted upon by a force towards the retracted position;
wherein said guides of said first guide set are vertically arranged with respect to each other and wherein said guides of said second guide set are vertically arranged with respect to each other;
wherein movements of said tool means and said workpiece carrier are synchronized;
wherein said tool means is moveably coupled to at least one of the workpiece and the workpiece carrier; and
wherein said tool means automatically returns to an initial position by movement in a direction opposite to the transportation direction upon decoupling from said one of the workpiece and the workpiece carrier.

25. The transport system of claim 24 wherein said tool carrier comprises a displacement means for displacing the working tools between a ready position and a work position, and wherein said displacement means comprises at least two transverse carriers that extend above the first and second guide sets, said working tools displaceable along said transverse carriers in a direction transverse to the transportation direction.

* * * * *